May 16, 1950 — L. W. STARNES — 2,508,047
CONNECTING ROD TOOL
Filed May 5, 1947
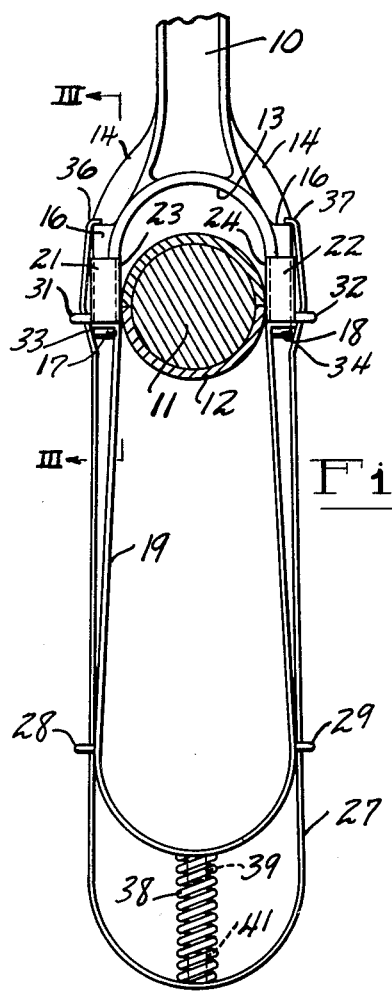
Fig. 1
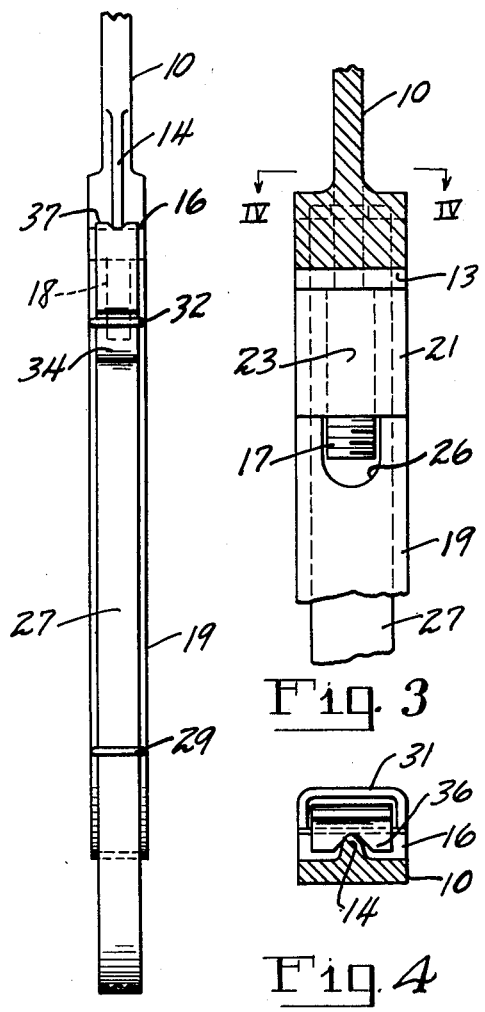
Fig. 2
Fig. 3
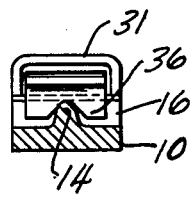
Fig. 4
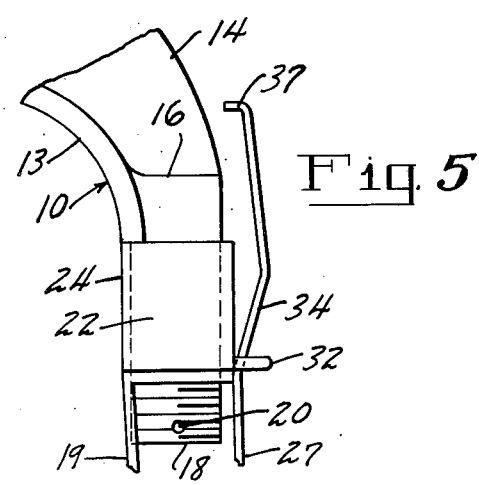
Fig. 5
INVENTOR.
Lewis W. Starnes
BY
Henry L. Jennings
Attorney Patented May 16, 1950

2,508,047

UNITED STATES PATENT OFFICE 2,508,047

CONNECTING ROD TOOL

Lewis W. Starnes, Birmingham, Ala.

Application May 5, 1947, Serial No. 746,135

5 Claims. (Cl. 29—278)

This invention relates to a tool for installing connecting rods in an internal combustion engine and has for an object the provision of a device of the character designated which shall be adapted to engage the connecting rod in such an engine and move it into position with respect to the crank shaft bearing without damage to the bearing.

A further object of my invention is to provide a tool for assembling connecting rods on crank shafts quickly and expeditiously, without damage to the crank shaft bearings, which tool shall be simple of design, economical of manufacture and easy to manipulate.

When assembling connecting rods about the crank shaft in an internal combustion engine, it has heretofore been the practice for one man to press against the piston in the open end of the cylinder to push the piston with its connecting rod toward the crank shaft, with another man guiding the bearing end of the connecting rod into position with respect to the crank shaft bearing. Inasmuch as the edges of the open sides of the connecting rod become quite sharp, they often engage the crank shaft bearings and damage them being assembled in the manner just described. In the design of my improved tool, I have provided means for engaging and pulling the connecting rod in place with guiding means to guide the sharp edges of the open end of the connecting rod past the crank shaft bearings. A tool embodying features of my invention is illustrated in the accompanying drawing, forming a part of this application, in which—

Fig. 1 is an elevational view showing the tool connected to a connecting rod to draw it into place on a crank shaft;

Fig. 2 is an elevational view taken at right angles to Fig. 1;

Fig. 3 is a sectional view taken on the line III—III of Fig. 1;

Fig. 4 is a sectional view taken along the line IV—IV of Fig. 3; and

Fig. 5 is a detail elevational view showing one of the engaging hooks of the tool in disengaged position with respect to the connecting rod.

Referring now to the drawings for a better understanding of my invention, I show the lower end of a connecting rod 10, a crank shaft 11, and a crank shaft bearing 12. The connecting rod 10 is provided with the usual semicircular recess 13 adapted to fit about the crank shaft bearing 12. The connecting rod 10 is shown as embodying the usual reinforcing ribs 14 and shoulders 16. Depending from the end of the rod are bolts or studs 17 and 18 by means of which the lower half of cap (not shown) of the connecting rod is secured.

My improved tool comprises a U-shaped yoke 19 carrying on its upper end a pair of lugs 21 and 22 each having an unthreaded hole extending the length thereof adapted to receive the studs 17 and 18. The inner surfaces 23 and 24 of the lugs are smooth and are in alignment with the terminal edges of the bearing recess 13. It will be noted from Fig. 1 of the drawing that the sides of the U-shaped member 19 flare outwardly towards the open end of the U which makes it necessary for each side to be provided with a small opening 26, as shown in Fig. 3, to accommodate the lower end of the associated studs 17 or 18 as the case may be.

Telescoped over the U-shaped member 19 is a second U-shaped member 27 which is held in place with respect to the U-shaped member 19 by means of metal loops 28 and 29 at the lower end thereof, as viewed in the drawing, and loops 31 and 32 near the upper end thereof. The loops 31 and 32 are carried by the lugs 21 and 22 and just below the said lugs the sides of the U are bent inwardly as shown at 33 and 34.

On the upper ends of the U-shaped member 27 are formed two hooks 36 and 37 which are adapted to engage over the shoulders 16 on the connecting rod as shown in Fig. 1 of the drawing. A spring 38 is interposed between the lower end of the U-shaped members to bias them apart and bring the hooks 36 and 37 into engagement with the shoulders 16 when applying the tool. Studs 39 and 41 carried respectively by the U-shaped members 19 and 27, serve to hold the spring 38 in place.

The operation of my improved tool is as follows. The open upper end of the tool is passed around the crank shaft bearing 12 in position to receive the studs 17 and 18. The tool is grasped in the hand, compressing the spring 38 and causing the upper end of the U-shaped member 27 to move upwardly with respect to the lugs 21 and 22. This causes the hooks 36 and 37 to spread apart due to the engagement of the inwardly bent portions 33 and 34 bearing against the bottoms of the lugs. The studs 17 and 18 may now be entered in the holes in the lugs 21 and 22 with the hooks 36 and 37 passing beyond the shoulders 16 as shown in Fig. 5 of the drawing. The pressure on the spring 38 is now relieved allowing it to separate the U-shaped members 19 and 27, whereupon the hooks 36 and 37 move inwardly to engage the shoulders 16. The connecting rod 10 may now be moved downwardly by pulling the lower end of the outer U-shaped member 27, thus seating the bearing recess 13 about the crank shaft bearing 12. As it moves downwardly, the sides of the bearing recess are guided by the smooth sides 23 and 24 of the lugs 21 and 22 which are in contact with the crank shaft bearing 12 and the sharp edges thereof are prevented from engaging with the bearing and damaging it. The tool may now be released by again compressing the spring 38 to spread the hooks 36 and 37 and pulling the tool downwardly to disengage the lugs 21 and 22 from the studs 17 and 18.

From the foregoing, it will be apparent that I have devised a tool for mounting connecting rods on the crank shaft of an internal combustion engine which is simple in design and operation, by means of which one man, unaided, can bring the connecting rod into engagement with the crank shaft bearing without danger of damaging the bearing, and which is simple of design and economical of manufacture. If it is desired to do so, the inner U-shaped member alone may be used for assembling the connecting rods, thus reducing considerably the cost of the tool. In using this part of the device alone, the studs 17 and 18 are inserted through the lugs 21 and 22, and a pin passed through the cotter pin hole 20 usually provided in the ends of the studs.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. A tool for assembling connecting rods and crank shaft bearings in an internal combustion engine in which the bearing ends of the connecting rods are divided and held together by bolts comprising a U-shaped member having lugs on the ends thereof with openings therein for receiving the bolts on the sides of the connecting rod, a resilient member fitting over the U-shaped member and having hooks on the ends thereof for engaging the sides of the connecting rod, a spring interposed between the U-shaped member and the resilient member, and means on the U-shaped member for spreading the hooks apart and disengaging them.

2. A tool comprising inner and outer nested U-shaped members, with the outer ends of the outer member extending beyond the outer ends of the inner member, lugs on the outer ends of the inner U-shaped member having bolt holes therein extending longitudinally of the U-shaped member, hooks on the outer ends of the outer U-shaped member, inwardly bent portions on the outer U-shaped member bearing against the inner ends of the lugs, and a spring for biasing the two U-shaped members apart longitudinally.

3. A tool as set forth in claim 2 in which the spring is interposed between the bent portions of the U-shaped member in position to be compressed by the hand of a workman grasping the U-shaped members.

4. A tool as set forth in claim 3 in which the U-shaped members are held in nested relation by means of straps on the inner member encircling the outer member.

5. A tool for assembling connecting rods on crank shafts in an internal combustion engine wherein the connecting rods are provided at their bearing ends with bolts for securing the halves together and wherein the connecting rods are provided with reinforcing shoulders adjacent the bearing portion, comprising inner and outer resilient U-shaped members, the outer of said members being longer than the other and having its free ends extending beyond the free ends of the inner member, loops on the inner member extending about the outer member to hold them in nested relation, hooks on the free ends of the outer member for engaging the shoulders on the connecting rod, lugs on the free ends of the inner member having bolt holes therein for receiving the connecting rod bolts, a spring interposed between the closed inner ends of the U-shaped members, and inwardly bent portions on the outer member disposed to spread and separate the hooks on the free ends of the outer member when the U-shaped members are moved longitudinally with respect to each other.

LEWIS W. STARNES.

REFERENCES CITED

The following references are of record in the file of this patent:

UNITED STATES PATENTS

| Number | Name | Date |
|---|---|---|
| 294,289 | Timberlake | Feb. 26, 1884 |
| 985,755 | Gilbert | Feb. 28, 1911 |
| 1,701,995 | Anderson | Feb. 12, 1929 |
| 2,193,458 | Koenig | Mar. 12, 1940 |

FOREIGN PATENTS

| Number | Country | Date |
|---|---|---|
| 662,633 | France | Mar. 25, 1929 |
| 686,360 | France | Apr. 14, 1930 |